United States Patent
Marcantonio

(10) Patent No.: US 10,066,758 B2
(45) Date of Patent: Sep. 4, 2018

(54) VALVE, IN PARTICULAR WATER DISCHARGE VALVE FOR TOILETS

(71) Applicant: R.P.E. S.R.L., Carbonate (IT)

(72) Inventor: Vincenzo Marcantonio, Carbonate (IT)

(73) Assignee: R.P.E. S.R.L., Carbonate (IT)

( * ) Notice: Subject to any disclaimer, the term of this patent is extended or adjusted under 35 U.S.C. 154(b) by 113 days.

(21) Appl. No.: 15/035,991

(22) PCT Filed: Nov. 19, 2014

(86) PCT No.: PCT/IB2014/066173
§ 371 (c)(1),
(2) Date: May 11, 2016

(87) PCT Pub. No.: WO2015/075651
PCT Pub. Date: May 28, 2015

(65) Prior Publication Data
US 2016/0265682 A1    Sep. 15, 2016

(30) Foreign Application Priority Data

Nov. 19, 2013  (IT) .............................. MI20130403 U

(51) Int. Cl.
| | |
|---|---|
| *F16K 31/40* | (2006.01) |
| *F16K 1/12* | (2006.01) |
| *F16K 27/02* | (2006.01) |
| *F16K 31/06* | (2006.01) |
| *E03D 5/00* | (2006.01) |

(52) U.S. Cl.
CPC ............ *F16K 31/406* (2013.01); *F16K 1/126* (2013.01); *F16K 27/02* (2013.01); *F16K 31/0655* (2013.01); *F16K 31/404* (2013.01); *F16K 31/408* (2013.01); *E03D 5/00* (2013.01)

(58) Field of Classification Search
CPC ............................. F16K 31/406; F16K 31/408
USPC .......................................... 251/30.02, 30.05
See application file for complete search history.

(56) References Cited

U.S. PATENT DOCUMENTS

| | | | |
|---|---|---|---|
| 2,516,247 A | 7/1950 | Nuenemann | |
| 2,969,088 A * | 1/1961 | Kramer | F16K 31/408 137/614.2 |
| 4,848,721 A | 7/1989 | Chudakov | |
| 5,294,089 A * | 3/1994 | LaMarca | F16K 31/42 251/30.02 |

(Continued)

FOREIGN PATENT DOCUMENTS

| | | |
|---|---|---|
| DE | 11 51 701 | 7/1963 |
| EP | 0 489 331 | 6/1992 |

(Continued)

*Primary Examiner* — R. K. Arundale
(74) *Attorney, Agent, or Firm* — Leason Ellis LLP

(57) ABSTRACT

A valve, in particular for water discharge of toilets, has a valve body having at least one feed port and a delivery port; a shutter assembly movable with respect to the valve body between an open position and a closed position; an auxiliary channel, which has the function of controlling the shutter assembly, extends from the feed port to the delivery port through the shutter assembly; a first auxiliary shutter controlled electrically for selectively closing the auxiliary channel; and a second auxiliary shutter for selectively closing the auxiliary channel as a function of the pressure generated by the opening of the first auxiliary shutter.

9 Claims, 2 Drawing Sheets

(56) References Cited

U.S. PATENT DOCUMENTS

| | | | | |
|---|---|---|---|---|
| 5,632,465 | A * | 5/1997 | Cordua | F16K 7/126 251/30.02 |
| 6,000,674 | A * | 12/1999 | Cheng | E03D 3/06 137/545 |
| 7,984,890 | B2 * | 7/2011 | Pfaff | F15B 13/0405 137/269 |
| 8,763,638 | B2 * | 7/2014 | Deubler | F16K 31/122 137/565.14 |
| 2009/0212244 | A1 | 8/2009 | Pfaff et al. | |
| 2010/0155633 | A1 * | 6/2010 | Pfaff | F15B 13/0405 251/30.02 |
| 2013/0153039 | A1 | 6/2013 | Deubler | |

FOREIGN PATENT DOCUMENTS

| | | |
|---|---|---|
| EP | 1 327 810 | 7/2003 |
| GB | 2 110 795 | 6/1983 |

* cited by examiner

VALVE, IN PARTICULAR WATER DISCHARGE VALVE FOR TOILETS

CROSS REFERENCE TO RELATED APPLICATIONS

The present application is a U.S. National Phase of International Patent Application PCT/IB2014/066173 filed on Nov. 19, 2014, which claims priority to Italian Application No. MI2013U000403, filed on Nov. 19, 2013, each of which is incorporated by reference as if expressly set forth in their respective entireties herein.

TECHNICAL FIELD

The present invention relates to a valve, in particular a water discharge valve for toilets.

BACKGROUND ART

Generally, a water discharge valve for toilets comprises a valve body and a moveable shutter assembly in the valve body between an open position and a closed position. Said types of valves are characterized by high flow rates, by very short opening periods, and sometimes by very long closing periods.

The present invention relates to a valve of the type identified above and provided with an auxiliary channel, which is configured to control the shutter assembly, and is selectively opened and closed by an auxiliary shutter, which, in turn, is controlled by a driving device. This configuration of the valve is particularly effective because it allows controlling high flow rates with little effort.

Although the valves with auxiliary channels have proven to be particularly reliable, sometimes it may be that they are not particularly fast and efficient in closing the shutter assembly.

DISCLOSURE OF INVENTION

The purpose of the present invention is to provide a valve of the type identified above which is simple, effective and aimed to mitigate the drawbacks of the prior art.

According to the present invention there is provided a valve, in particular for water discharge of toilets, the valve comprising a valve body having at least one feed port and a delivery port; a shutter assembly movable with respect to the valve body between an open position and a closed position; an auxiliary channel, which has the function of controlling the shutter assembly, extending from the feed port to the delivery port through the shutter assembly; a first electrically driven auxiliary shutter for selectively closing the auxiliary channel; and a second auxiliary shutter for selectively closing the auxiliary channel as a function of the pressure generated by the opening of the first auxiliary shutter.

In this way, the valve opening determines the closing of the second auxiliary shutter and shortly after, the closing of the valve. Consequently, even in the absence of the closure of the first auxiliary shutter caused by a drawback, the valve, once having performed an opening of short duration, is again arranged in the closed position.

Preferably, the shutter assembly comprises a sleeve, through which the auxiliary channel extends and in which the further auxiliary shutter is housed.

From the construction point of view, it is suitable to confine the further auxiliary shutter inside the sleeve.

Preferably, the sleeve has a cylindrical hole at its free end and the second auxiliary shutter comprises a conical body configured to be inserted into the cylindrical hole and a head suited to receive the thrust generated by the pressure in the auxiliary channel so as to force the conical portion into the cylindrical hole.

This configuration allows to easily insert the additional auxiliary shutter.

According to a preferred embodiment of the present invention, the valve comprises at least one elastic element to keep the second auxiliary shutter in the open position in the absence of pressure in the auxiliary channel.

In this way, the extraction of the second auxiliary shutter is performed by the elastic element.

Preferably, the auxiliary channel extends through a pipe, which is slidably coupled to the sleeve.

In this way, the pipe defines a further guide for the shutter assembly and the auxiliary channel has a variable length configuration, at least along the final portion.

According to a preferred embodiment of the present invention, the auxiliary channel extends through a variable volume chamber, which is delimited by the valve body and by the shutter assembly and is arranged between the feed port and the first auxiliary shutter so that, when the auxiliary channel is closed, the pressure in the chamber exerts thrust upon the shutter assembly such as to maintain the shutter assembly in the closed position and, when the auxiliary channel is open, the shutter assembly moves to the open position thus minimizing the volume of the chamber.

In this way, the water flowing into the auxiliary channel exerts the pressure necessary to move the entire shutter assembly to the closed position.

According to a preferred embodiment of the present invention, the second auxiliary shutter is arranged along the auxiliary channel between the first auxiliary shutter and the delivery port so that, when the first auxiliary shutter is in the closed position, the absence of pressure in the section of the auxiliary channel downstream of the first auxiliary shutter allows the second auxiliary shutter to assume an open position and, when the first auxiliary shutter is in the open position the pressure in the downstream portion of the first auxiliary shutter arranges the second auxiliary shutter in the closed position.

The water flowing in the auxiliary channel also exerts the pressure required to close the second auxiliary shutter.

Preferably, the first auxiliary shutter is controlled by a driving device of the electromagnetic type, preferably of the bi-stable type.

According to a preferred embodiment of the present invention, the valve body is formed as a cartridge, having external gaskets, and is insertable in a seat formed inside a tubular element.

In this way, the valve can be hidden inside a duct.

BRIEF DESCRIPTION OF THE DRAWINGS

Further characteristics and advantages of the present invention will become clear from the following description of a non-limiting embodiment, with reference to the figures of the accompanying drawings, wherein.

BEST MODE FOR CARRYING OUT THE INVENTION

Figure 1:
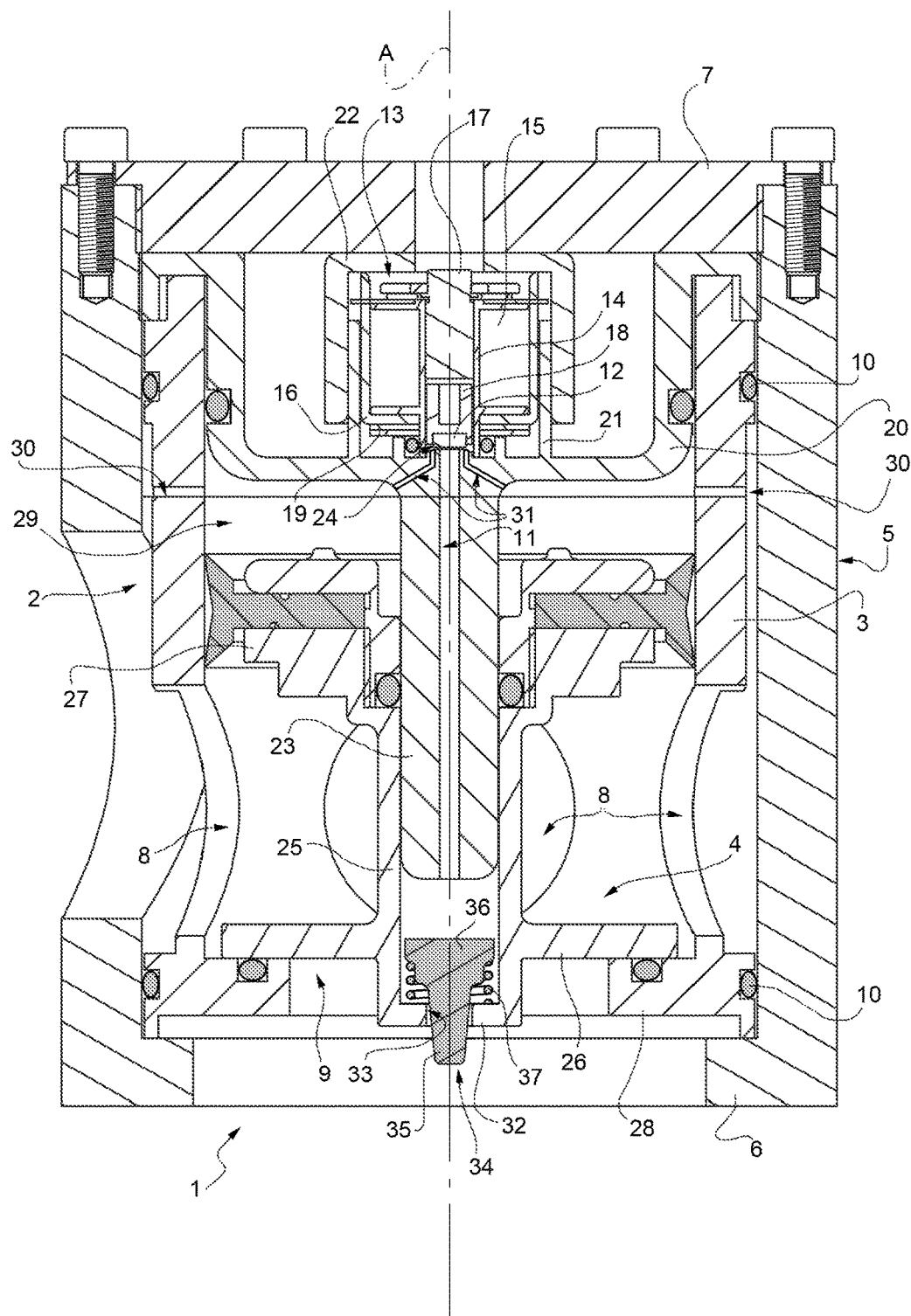
FIG. 1 is a longitudinal sectional view, with parts removed for clarity, of a valve in closed position and implemented according to the present invention.

In FIG. 1, 1 indicates as a whole a valve which finds particular application in the toilet field.

Figure 2:
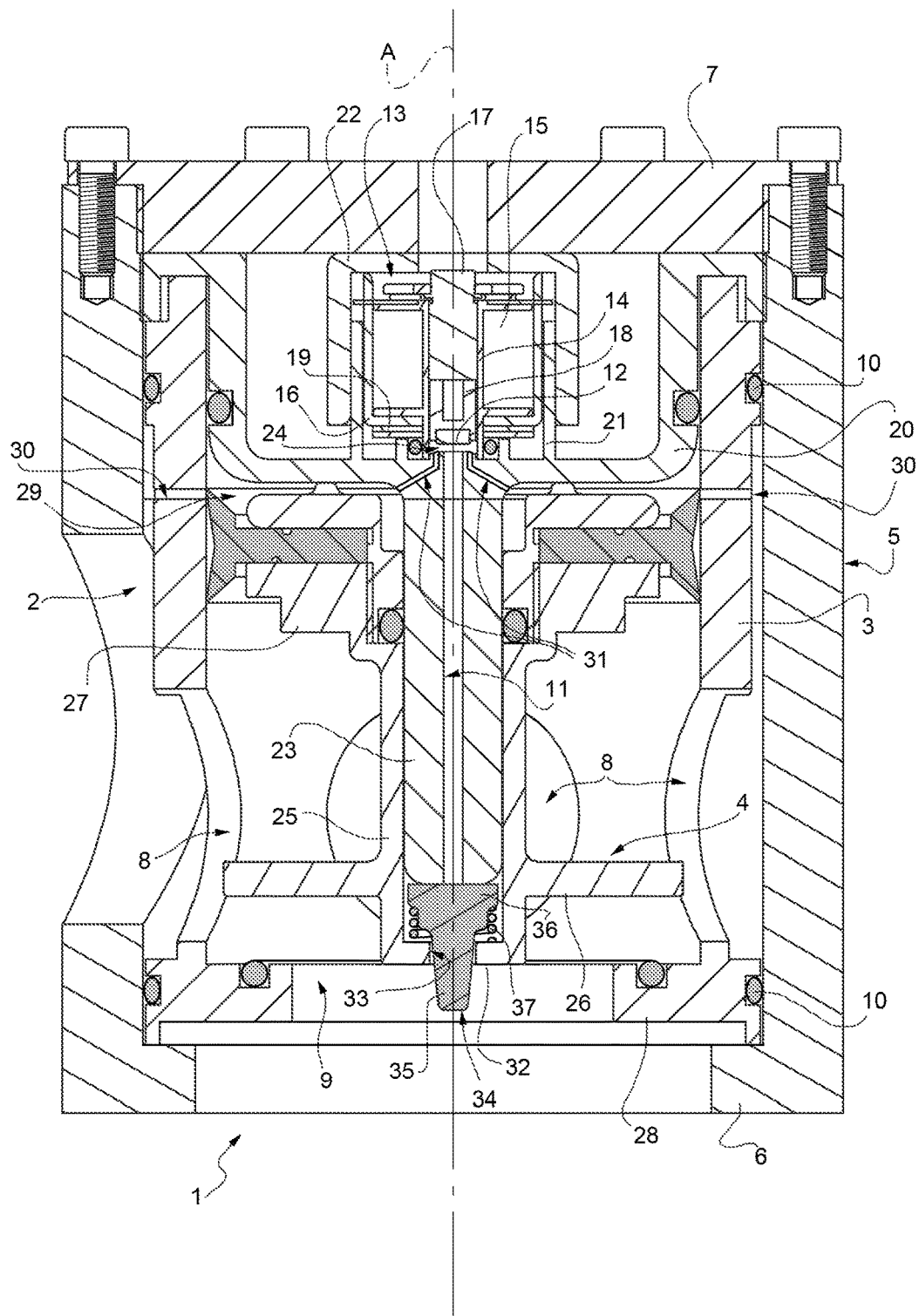
FIG. 2 is a longitudinal sectional view, with parts removed for clarity, of the valve of FIG. 1 in the open position.

The valve 1 extends along an axis A and comprises a valve body 2 having a tubular wall 3; a shutter assembly 4 movable along the axis A with respect to the valve body 2 between a closed position (FIG. 1) and an open position (FIG. 2). In the example shown, the valve 1 is configured as a cartridge and is inserted in a seat formed in a tubular element 5 and is fixed in an axial position defined by a ring shoulder 6 of the tubular element 5, and a flange 7 connected to the tubular element 5.

The valve body 2 has a plurality of lateral feed ports 8 formed in the tubular wall 3 and in communication with a feed duct, not illustrated in the attached figures; and a delivery port 9 in axial communication with a delivery duct not shown in the attached figures.

The valve body 2 has two seats formed along the outer surface of the tubular wall 3 and configured to house two respective annular gaskets 10 arranged on opposite sides of the feed ports 8 and in contact with the tubular element 5 so as to form an annular cavity between the two gaskets 10 and between the tubular element 5 and the tubular wall 3. Said cavity is in constant communication with the delivery duct.

The valve 1 comprises an auxiliary channel 11 configured to selectively by-pass the shutter assembly 4; an auxiliary shutter 12 arranged along the auxiliary channel 11, auxiliary and movable between a closed position of the auxiliary channel 11 (FIG. 1) and an open position of the auxiliary channel 11 (FIG. 2); and a driving device 13 for selectively varying the position of the auxiliary shutter 12.

The valve body 2 supports the driving device 13, which in the example shown comprises a spool 14, a coil 15 wound around the spool 14; a magnetic yoke 16 arranged around the coil 15; a core 17 aligned with the axis A and in part within the coil; a slider 18, which is aligned to the core 17 and is integral with the auxiliary shutter 12; and an annular permanent magnet 19 arranged below the magnetic yoke 16 and in contact with the same. The driving device 13 is of the bi-stable type, i.e. the size of the magnetic yoke 16, of the core 17, of the slider 18, and of the permanent magnet 19 and their relative positions are selected so that the slider 18 stably occupies both the closed position, and the open position in the absence of electrical power supply to the coil 15. In other words, the coil 15 is supplied with an electrical pulse each time it is necessary to determine a change of state of the slider 18, i.e. opening or closing the valve 1.

In the example shown, the valve body 2 comprises a wall 20, which has a disk-like portion and a tubular portion and is stably coupled in a sealed manner with the tubular wall 3; a tubular wall 21, which forms a housing for the driving device 13; a cover 22 for closing the housing of the driving device 13; and a pipe 23 which extends from the wall 20 at the opposite side of the driving device 13 and towards the delivery port 9.

The upper end of the pipe 23 defines the abutment for the auxiliary shutter 12 and, together with the spool 14 defines an annular chamber 24 arranged around the auxiliary shutter 12.

The shutter assembly 4 is arranged inside the tubular wall 3 is coupled in a sliding manner and in a sealed manner with the valve body 2; the coupling of the shutter assembly 4 with the valve body 2 takes place with both the tubular wall 3, and with the pipe 23. In this case, the shutter assembly 4 comprises a sleeve 25, and two disks 26 and 27 arranged at opposite ends of the sleeve 25.

The sleeve 25 is slidably coupled and in a sealed manner with the pipe 23. The disk 26 is configured to be arranged in watertight abutment onto an annular shoulder 28 of the tubular wall and has the function of a shutter. The disk 27 is coupled in a sealed manner with the valve body 2 and defines, together with the valve body 2 a chamber 29 and has the function of a piston.

The auxiliary channel 11 extends along openings 30 which connect the cavity with the chamber 29; the chamber 29; channels 31 formed in the cover 3 and which connect the chamber 29 with the annular chamber 24; with the pipe 23; and with the sleeve 25.

The sleeve 25 has a shoulder 32, which is arranged at the end adjacent to the disk 26 and has a cylindrical hole 33.

The valve 1 comprises a further auxiliary shutter 34, which is housed at least partially inside the sleeve 25, is inserted into the hole 22, and protrudes from the sleeve through the hole 12. The additional auxiliary shutter 34 comprises a conical body 35 and a countersunk head 36. The conical body 35 is configured to be inserted into the hole 33, while the head has a diameter smaller than the inner diameter of the sleeve 25.

The valve 1 also comprises an elastic element 37, in the example shown a helical spring, which keeps the auxiliary shutter 34 in the extracted position with respect to the hole 33.

According to an alternative embodiment not shown in the attached figures, the elastic element is defined by the auxiliary blades integral with the shutter 34 that extend radially and are arranged in contact with the sleeve.

In use, in the configuration illustrated in FIG. 1, the auxiliary shutter 12 is arranged in the closed position; the auxiliary shutter 34 is arranged in the open position; the chamber 29 is pressurized and keeps the shutter assembly 4 in abutment against the annular shoulder 28; and the valve 1 is closed.

The power supply of the coil 15 causes the lifting of the slider 18 and the of auxiliary shutter 12; the opening of the auxiliary channel 11; and the lowering of the pressure in the chamber 29. Consequently, the valve 1 passes from the configuration shown in FIG. 1 to the configuration shown in FIG. 2 wherein the shutter assembly 4 is in the open position.

The displacement of the shutter assembly 4 towards the cover 3 causes a relative flow between the pipe 23 and the sleeve 25. The passage of water through the auxiliary channel 11 determines in the first place an increase of the hydrodynamic pressure that acts on the auxiliary shutter 34 so as to push the conical part 35 of the auxiliary shutter 34 into the hole 33. As the shutter 34 is pushed into the hole 33, the hydrodynamic pressure is transformed into static pressure that keeps the shutter 34 in the closed position.

In this way, the opening of the auxiliary shutter 12 determines the opening of the shutter assembly 4 and the discharge of water, and, at the same time, determines the progressive closure of the auxiliary shutter 34, which, in turn, determines the closure of the auxiliary channel 11 with the consequent increase of the pressure of the chamber 29 and, therefore, the closure of the shutter assembly 4.

Once an electrical pulse has been transmitted to the coil 15, the driving device 13 changes the configuration of the auxiliary shutter 12, which is again arranged in the closed position of FIG. 1 thus determining a pressure drop inside the sleeve 25. To facilitate the pressure drop, the auxiliary shutter 34 is preferably configured to allow a leakage of water through the hole 33 even when arranged in the closed position.

The aforementioned pressure drop allows the elastic element 37 to extract the auxiliary shutter 34 from the hole 33 and drain the water from the pipe 23 and from the sleeve 25.

In essence, the valve 1, once opened, is automatically and quickly closed again thanks to the closure of the auxiliary channel 11 by means of the auxiliary shutter 34. Consequently, also in coincidence with a malfunction of the driving device 13, the valve 1 is closed again quickly without wasting water.

At the most a water leak between the auxiliary shutter 34 and the hole 33 may be possible.

It is evident, finally, that to the present invention variations may be made with respect to the described embodiments without departing from the scope of the appended claims.

The invention claimed is:

1. A valve for the discharge of water for toilets, the valve comprising a valve body having at least one feed port and a delivery port; a shutter assembly movable with respect to the valve body between an open position and a closed position; an auxiliary channel, which has the function of controlling the shutter assembly, extending from the feed port to the delivery port through the shutter assembly; a first auxiliary shutter electrically controlled for selectively closing the auxiliary channel; and a second auxiliary shutter for selectively closing the auxiliary channel as a function of the pressure generated by the opening of the first auxiliary shutter;
   wherein the shutter assembly comprises a sleeve, through which the auxiliary channel extends and in which the second auxiliary shutter is housed;
   wherein the sleeve has a cylindrical hole at its free end and the second auxiliary shutter comprises a conical body configured to be inserted into the cylindrical hole and a head to receive the pressure thrust in the auxiliary channel in order to force the conical portion into the cylindrical hole.

2. The valve as claimed in claim 1, further comprising at least one elastic element to maintain the second auxiliary shutter in the open position in the absence of pressure in the auxiliary channel.

3. The valve as claimed in claim 1, wherein the auxiliary channel extends through a pipe, which is slidably coupled to the sleeve.

4. The valve as claimed in claim 1, wherein the auxiliary channel extends through a variable volume chamber, which is delimited by the valve body and by the shutter assembly, and is arranged between the feed port and the first auxiliary shutter so that, when the auxiliary channel is clogged, the pressure in the chamber exerts a thrust on the shutter assembly such as to maintain the shutter assembly in the closed position and, when the auxiliary channel is opened, the shutter assembly moves to the open position thus reducing the volume of the chamber.

5. The valve as claimed in claim 1, wherein the second auxiliary shutter is arranged along the auxiliary channel between the first auxiliary shutter and the delivery port so that, when the first auxiliary shutter is in the closed position, the absence of pressure in a section of the auxiliary channel downstream of the first auxiliary shutter allows the second auxiliary shutter to assume an open position and, when the first auxiliary shutter is in the open position the pressure in the downstream portion of the first auxiliary shutter arrange the second auxiliary shutter in the closed position.

6. The valve as claimed in claim 1, wherein the first auxiliary shutter is controlled by a driving device of an electromagnetic type.

7. The valve as claimed in claim 1, wherein the valve body is formed as a cartridge, has external sealing gaskets, and is insertable in a seat formed inside a tubular element.

8. The valve as claimed in claim 6, wherein the electromagnetic type is of a bi-stable type.

9. A valve for the discharge of water for toilets, the valve comprising a valve body having at least one feed port and a delivery port; a shutter assembly movable with respect to the valve body between an open position and a closed position; an auxiliary channel, which has the function of controlling the shutter assembly, extending from the feed port to the delivery port through the shutter assembly; a first auxiliary shutter electrically controlled for selectively closing the auxiliary channel; and a second auxiliary shutter for selectively closing the auxiliary channel as a function of the pressure generated by the opening of the first auxiliary shutter; wherein the second auxiliary shutter is arranged along the auxiliary channel between the first auxiliary shutter and the delivery port so that, when the first auxiliary shutter is in the closed position, the absence of pressure in a section of the auxiliary channel downstream of the first auxiliary shutter allows the second auxiliary shutter to assume an open position and, when the first auxiliary shutter is in the open position the pressure in the downstream portion of the first auxiliary shutter arrange the second auxiliary shutter in the closed position.

* * * * *